US009604743B2

(12) United States Patent
Nitsch et al.

(10) Patent No.: US 9,604,743 B2
(45) Date of Patent: Mar. 28, 2017

(54) DEVICE FOR FORMING PACKAGING UNITS

(71) Applicant: KHS GmbH, Dortmund (DE)

(72) Inventors: Thomas Nitsch, Kleve (DE); Christopher Stuhlmann, Korbach (DE); Ernst Van Wickeren, Weeze (DE); Stefan Wagner, Xanten (DE); Volker Zahn, Volkmarsen (DE)

(73) Assignee: KHS GmbH, Dortmund (DE)

( * ) Notice: Subject to any disclaimer, the term of this patent is extended or adjusted under 35 U.S.C. 154(b) by 346 days.

(21) Appl. No.: 14/362,217

(22) PCT Filed: Nov. 15, 2012

(86) PCT No.: PCT/EP2012/004745
§ 371 (c)(1),
(2) Date: Jun. 2, 2014

(87) PCT Pub. No.: WO2013/079164
PCT Pub. Date: Jun. 6, 2013

(65) Prior Publication Data
US 2014/0311103 A1    Oct. 23, 2014

(30) Foreign Application Priority Data

Dec. 2, 2011   (DE) ................ 10 2011 119 969
Mar. 26, 2012  (DE) ................ 10 2012 005 925

(51) Int. Cl.
*B65B 27/04*    (2006.01)
*B65B 17/02*    (2006.01)
(Continued)

(52) U.S. Cl.
CPC .............. *B65B 27/04* (2013.01); *B65B 17/02* (2013.01); *B65B 21/06* (2013.01); *B65B 35/54* (2013.01);
(Continued)

(58) Field of Classification Search
CPC ......... B65B 17/02; B65B 27/04; B65B 35/16; B65B 35/18; B65B 35/36; B65B 35/38;
(Continued)

(56) References Cited

U.S. PATENT DOCUMENTS 2,968,898 A    1/1961   Hickin
3,225,510 A    12/1965  Jones
(Continued)

FOREIGN PATENT DOCUMENTS

DE    2331193    1/1975
DE    4126212    2/1993
(Continued)

*Primary Examiner* — Carson Gross
(74) *Attorney, Agent, or Firm* — Occhiuti & Rohlicek LLP (57) ABSTRACT

An apparatus for producing a container pack includes a linear transporter, applicator elements, and head guides. The linear transporter has first, second, and third sections. Transport surfaces run parallel to one another in said first section, are oriented at an angle to one another in said second section, and again run parallel to one another in said third section. The second section comprises applicator elements having transversely displaceable and rotatable head guides for single-container transport along said three sections. The apparatus is configured to bring containers together in said third section to form said pack and to transport said pack towards a discharge side.

12 Claims, 8 Drawing Sheets (51) Int. Cl.
*B65B 21/06* (2006.01)
*B65B 35/54* (2006.01)
*B65G 47/08* (2006.01)
*B65G 47/86* (2006.01)
B65B 35/16 (2006.01)
B65B 35/36 (2006.01)
B65B 35/44 (2006.01)

(52) U.S. Cl.
CPC ......... *B65G 47/088* (2013.01); *B65G 47/842* (2013.01); *B65B 35/16* (2013.01); *B65B 35/36* (2013.01); *B65B 35/44* (2013.01); *B65G 2201/0244* (2013.01); *Y10T 156/1744* (2015.01)

(58) Field of Classification Search
CPC  B65B 13/20; B65B 21/06; B65C 9/04; B65C 9/06; B65G 47/06–47/12; B65G 47/14; B65G 47/24; B65G 47/244; B65G 47/68; Y10T 156/1744
See application file for complete search history.

(56) References Cited

U.S. PATENT DOCUMENTS

| | | | | |
|---|---|---|---|---|
| 3,783,587 | A | * | 1/1974 | Kurtenbach .......... B65B 21/183 53/247 |
| 3,864,890 | A | * | 2/1975 | Ullman ................. B65B 21/183 53/247 |
| 6,868,652 | B2 | * | 3/2005 | Arends .................. B65B 21/04 198/376 |
| 6,889,485 | B2 | | 5/2005 | Davaillon |
| 7,726,464 | B2 | | 6/2010 | Cerf |
| 7,832,553 | B2 | | 11/2010 | Hartness |
| 2011/0073511 | A1 | * | 3/2011 | Perl ........................ B65B 27/04 206/428 |

FOREIGN PATENT DOCUMENTS

| | | | | |
|---|---|---|---|---|
| DE | 102006037105 | | 2/2008 | |
| DE | 102009025824 | | 11/2010 | |
| DE | 102009025824 | A1 * | 11/2010 | ............. B65B 17/02 |
| DE | 102009044271 | | 4/2011 | |
| EP | 2096039 | | 9/2009 | |

\* cited by examiner

DEVICE FOR FORMING PACKAGING UNITS

RELATED APPLICATIONS

This application is the national stage of PCT/EP2012/004745, filed on Nov. 15, 2012, which claims the benefit of the Dec. 2, 2011 priority date of DE 10 2011 119 969.5 and Mar. 26, 2012 priority date of DE 10 2012 005 925.6, the contents of which are herein incorporated by reference.

FIELD OF INVENTION

The invention relates to container processing, and in particular, to producing packaging units.

BACKGROUND

A known way to combine containers into a group of containers to produce firm and/or transportable storage and transport units or packaging units involves the use of shrink films, as described in U.S. Pat. No. 7,726,464. One of the disadvantages of this is that the films used, and in particular the shrinking-on of the films by the application of heat or energy, causes considerable expense.

Another way to form such packs is to strap containers together, as described in DE 10200902824, DE 102009044271, and DE 4126212). This is a particularly inexpensive and simple way of producing packaging units or transport and storage units. The strapping can also be bonded with the containers.

One disadvantage of strapping, however, is that when one container is removed from such a pack, the strapping no longer holds the containers remaining in the pack together. This is the case not only when the strapping is removed or cut, but also when it is possible to take a container from the pack without severing the strapping.

Moreover transporting such packaging units on a belt conveyor typically presents the danger that cylindrical or chiefly cylindrical articles, such as cans, bottles or containers, assume a nesting position, i.e. slip into a gap in the adjacent row, due to vibration, impacts etc. With known packaging units, a very high tension must be applied to the strapping in order to avoid this.

DE 102006037105 describes a method for combining of bottle packets in which a rotary star wheel that presses bottle necks into clips on flat carriers is provided on both sides of a track. The bottle packet is also wrapped with a tape or an envelope.

According to DE 2331193, an adhesive is applied to containers in narrow surfaces or rows, with contiguous surfaces that are not provided with adhesive being intended to facilitate a gripping of the packing for carrying purposes. The containers stick to one another at the adhesive points. EP 2096039 also relates to containers being provided with an adhesive, with a shrink film also being disposed around the bottle packet however.

SUMMARY

An object of the invention is to provide a device and a method for producing packaging units that avoid the need for an enveloping film and/or strapping, but that nevertheless prevents the articles in the packaging unit from adopting a nesting position while being transported. It is also an object to maintain cohesion of remaining articles in a packaging unit even when one of the articles is removed from the packaging unit.

One device that achieves the foregoing object has a linear transporter that has three sections to be described hereinafter, and that transports the containers from an inlet side towards an outlet side, with applicator elements for applying bonding or adhesive agent being provided in a second section of the linear transporter, and with transversely displaceable and rotatable head guides for individual container transport being provided along the three sections, i.e. along the linear transporter, and with the containers being combined in a third section to form the complete pack transported towards the discharge side.

The containers arrive in a stream converted by lane division from a wide container stream into a plurality of single-track container flows, and part-packaging units being formed with at least one compartment and/or compressor unit for compartmentalizing and compressing a predetermined number of containers. The part-packaging units are subsequently combined to form the later pack, with applicator elements being provided such that at least one of the containers of the pack exhibits a bonding or adhesive agent and/or a bonding or adhesive agent application on at least one contact surface or interface.

As used herein, "containers" includes bottles, cans, tubes, pouches made from metal, glass and/or plastic, including PET bottles, and other packaging elements, in particular those that are suitable for the filling of liquid or viscous products, and containers already combined into groups. Such containers, e.g. PET bottles, typically have a spherically arched contact region such that the containers can roll off against one another around a peripheral path, i.e. at a "roll-off ring". This can be seen in glass bottles that have been repeatedly used as a wear ring. In the case of PET bottles such roll-off rings can be arranged not only in the head region but in the foot region also.

As used herein, the term "adhesive agents" is intended to include materials or masses that facilitate an adhesive bond between containers, in particular compounds, materials or masses that, when applied in the liquid or semi-liquid state, form a self-adhesive coat and/or bring about an adhesive bond under the application of pressure and/or energy and/or after curing or cross-linking, including through application of energy.

As used herein, "bonding agents or adhesives" is intended to include multilayer materials, for example, those comprising at least one carrier material that is coated with a material with which an adhesive bond between containers is possible, and therefore have two sides that are ready to adhere or bond to other surfaces. Such adhesive agents can also be referred to as "pads."

As used herein, an "adhesive" container is on that has a bonding agent or adhesive or is provided with an application of bonding agent and adhesive. The bonding agent or adhesive is preferably selected such that the containers can be detached from the pack and/or separated from one another by hand and without damage.

It is conceivable for the liquid adhesive agent to be applied by the application elements. It is possible to apply a low-viscosity UV-curing adhesive. A hot-melt adhesive would also be suitable. But such an adhesive cools very rapidly however and could possibly lose its adhesive properties before the containers of the pack are sufficiently bonded to one another.

A UV-curing adhesive is also beneficial because it sets into its desired properties with relative ease. A corresponding curing station or curing section is usefully provided downstream of the application elements statically or along the linear transporter above and if necessary also below. Such a curing station can, for example, be a tunnel with UV-lighting.

It is advantageous if, in its first section, the linear transporter has a plurality of transport surfaces that accompany the containers from an inlet side towards a discharge or outlet side and towards the second section of the linear transporter.

It is also advantageous if the number of transport surfaces matches the number of single-track container flows. Two transport surfaces can, for example, be provided.

In the first section, the exemplary two transport surfaces are parallel to one another but spaced apart when seen square to the transport direction. The second section follows the first section. The second section, in turn, merges into the third section.

In the second section, it is preferable that the two transport surfaces be angled toward one another such that, when seen in plan view, a conically tapering linear transporter is formed in the second section.

Finally, in the third section, the mentioned two transport surfaces are once again parallel to one another but exhibit no or only a minimal distance from one another square to the transport direction, as will be detailed hereinafter.

It is advantageous for the head guides to be rotatable as well as transversely displaceable as a rotation can then be overlaid over a linear motion.

The head guides can be configured at their holding end with a tulip of the type known from their use in, for example, labeling machines. Opposite their holding or guiding end, the head guides can have a control extension that engages a guide rail. The head guide can also have a moving element that is mounted to be displaceable on a cross-rail.

The moving element may also be referred to as a plate that, when seen in the transport direction, has, at its ends, recesses or bores through which the cross-rails engage. The cross-rails, when seen in the transport direction, are spaced apart from one another and each held at their ends in a drive element. The drive element may be a chain or a toothed belt and is preferably circulating.

A connecting element that connects the guiding end to the holding end engages through the moving element. In a preferred embodiment the connecting element exhibits a non-rotatably mounted sleeve in which a shaft is disposed. Despite its non-rotatable mounting, the sleeve is mounted so as to be vertically movable, as detailed hereinafter. In a preferred embodiment the sleeve may have a larger diameter at its guiding end than at its holding end.

In a preferred embodiment, two head guides each to be are disposed on common cross-rails. For each head guide there is arranged, above the transport surface, a guide rail through which the control extension engages. The center-line of the guide rail is expediently congruent with the center-line of the respectively associated transport surface. This also means that the guide rail is configured identically to the course of the linear transporter in its three sections.

Among other things it is preferable to arrange the two guide rails in the first section at a distance apart from one another when seen square to the transport direction. In the second section the two guide rails run at an angle toward one another and then, in the third section, they continue on running parallel adjacent to one another.

As the control extension now traverses the second section, it effects a transverse displacement of the respective, initially spaced-apart head guides toward one another as the tulip simultaneously rotates. This brings the control extension into rotational engagement with the shaft. Measures that prevent a rotation can be provided in the first and third section. Such measures can be provided in the interaction of the guide rail with the control extension. A defined rotation of the containers held on the respective head guide can be brought about in this way.

The center-line center-lines of the guide rails need not be arranged congruent with the center-line of the transport surfaces. An offset arrangement in which the control extension is then correspondingly configured is conceivable to be able to effect a transverse displacement and a rotation.

The applicator elements are disposed in the second section and apply the bonding or adhesive agent to the containers or to their contact surfaces and interfaces. In a one preferred embodiment, a plurality of applicator elements are provided one after the other when seen in the transport direction. This makes allowance for rotation of the container that is being held at the respective tulip. Through the rotation of the containers along the transport direction, which is angled in the second section, contact surfaces and interfaces that are offset when seen in the peripheral direction of the containers can have bonding or adhesive agent applied thereon. This promotes a good adhesive bonding of the pack as a whole because every container can form an adhesive bond with its immediately neighboring container on at least two contact surfaces and interfaces.

In the third section, the head guides and containers held thereon are brought closer to one another, with the pack being formed, preferably, from six containers. In the process, the head guides may exert a force square to the transport direction such the containers of a pack are pressed up against one another under the action of force. This promotes formation of a good adhesive bond. The guide rails could also be moved closer so as to increase the acting pressing force.

The sleeve is mounted so that it can move vertically but not rotate. The rotation of the control extension is transmitted to the tulip by the inner shaft.

In one preferred embodiment, a height control is provided to lower the tulip of the head guide down onto the containers at the entrance to the first section and lift it off at the exit from the third section. In a preferred embodiment, the height control has a rail or transition elements arranged parallel to the guide rail that exhibits, at the entrance to the first section, a lowering transition that becomes narrower in the manner of a wedge, and at the exit from the third section an opposing lifting transition that becomes wider in the manner of wedge. A height control element that, at its free end, has, for example, a roller for rolling along the rail and the transitions, and that is permanently connected to the sleeve by a link opposite the free end, is interactively coupled with the rail and with the transitions. By rolling and/or guiding along the rail and/or the transitions the change in height along the transport direction can thus be correspondingly transmitted to the head guides or to the sleeves and hence to the tulips for lowering and lifting.

In order to limit the lowering movement, the rail can be continued on in the three sections between the transitions. The rail is not absolutely necessary along the first to the third section between the transitions. It may be sufficient if the wedge-shaped lowering transition is provided at the entry to the first section and the wedge-shaped lifting transition is only provided at the exit from the third section, it being possible to dispense with a height control, i.e. a continuation of the rail between the two transitions.

Instead of a rail it is possible to provide a lock that limits a vertical movement in the lowering direction. Such a lock can be seen in the configuration of the sleeve that exhibits a greater diameter at the guiding end than at the holding end such that the sleeve lowers down onto the moving element, i.e. onto the transversely displaceable plate, by the ring flange that is proud of the amount of the diameter at the holding end, when the lowering transition is passed, and lifts off the plate again when the lifting transition is passed.

The number of head guides matches the number of single-track container flows such that, for example, two adjacent head guides can be provided on common cross-rails. A plurality of cross-rails are provided. The head guides engage over the container head with the tulips from above to stabilize their position during transport of the containers in the transport direction. The head guides facilitate keeping containers stable while bringing together the container flows to form the pack. The head guides maintain stability even along the transport surfaces or guide rails that run at an angle to the direction of the center-line.

The head guides however also have the function of exerting sufficient force on the bundled containers. This also promotes a good adhesive bond. It is advantageous if the head guides can be displaced relative to the cross-rails, with the head guides and the containers they guide being moved toward one another and with the containers of a pack being pressed against one another under the action of a force along their transport path in the third section.

In some embodiments, an electromotive drive replaces the guide rail and the height control. It is also conceivable to already bring together and bond to each other containers of a common transport surface in the second section of the linear transporter, with the then inter-bonded part-packaging units being subsequently combined to form the complete pack in the third section.

In some embodiments, it is advantageous to provide entraining elements that can be configured so as to continuously circulate and that can assist the transport along the respective transport surface in interaction with the head guides.

Lateral guide elements can be disposed at the transport surfaces, for example at the transport surfaces of the third section. The guide elements are spaced apart from one another square to the transport direction such that the containers contained in a complete pack are pressed up against one another by the head guides in addition to the force already applied. The action of force is in turn conducive to the production of the adhesive bond.

The guide elements can be implemented as guide rails that guide or support the packaging units or the containers of the pack guided between them. It is conceivable for the guide elements to be rigidly implemented. It is, however, also possible for the guide elements to be configured as travelling elements with the transport surfaces such that the containers or packaging units do not have a speed relative to the laterally disposed guide elements. In other words, the guide elements could not only have the function of guiding and supporting but also the function of generating a pressure acting on the containers, which when seen square to the transport direction, compresses the containers of the pack and draws them nearer to one another, pressing them against one another so as to promote an adequate adhesive bond.

If UV-curing adhesive is applied, then a curing station or curing section can be provided in the third section after the containers have been brought together to form the pack. The curing station may be disposed above or below the transport surfaces. An example of a curing station is a tunnel with UV lighting. Entraining elements could also be provided at the third section to assist the transport of the complete pack towards the discharge side. If pads are applied, then appropriate devices can be provided to carry away the accruing residual carrier materials.

The pack can have a plurality of rows when seen in the transport direction, for example, two or three rows. It is possible to dispose the applicator elements not just rigidly on the linear transporter but also moveably such that the applicator elements could be entrained at least for a partial distance along with the respective container stream.

It is possible also to provide the pack, i.e. the complete pack, with a carrying element, for example a handle. To provide such a carrying element, suitable devices may be provided which are arranged downstream of the discharge side or at a suitable position on the linear transporter. The carrying element can be attached to the pack with the aforementioned adhesive agent.

The invention therefore provides a device for producing a pack and that, despite the lack of an enveloping film and/or despite the lack of strapping, prevents in a simple manner, the containers from adopting a nesting position while being transported. And, even after one or more containers are removed from a pack, the cohesion of the remaining containers in the pack is maintained and/or can be restored. Dispensing with a film or strapping band (filmless bottle pack) eases the burden on the environment by avoiding waste. This also saves resources used to produce the films or strappings that are usually produced from plastic. The containers of a pack are stuck directly to one another during transport, i.e. in the continuous operation of the device for producing packaging units. A filmless bottle pack can also be achieved with a minimum adhesive application that exhibits an adequate bond of the individual containers to one another.

In one aspect, the invention features an apparatus for producing a container pack with containers received from a plurality of single-track container flows that have been converted by lane division from a wide container stream. A grouping device compartmentalizes and compresses a pre-determined number of containers and forms the containers into part-container packs that are to be subsequently combined to form the container pack. Applicator elements provide at least one of the containers of the container pack with an adhesive on either a contact surface of interface thereof. The adhesive is a bonding agent and an adhesive agent. The apparatus including a linear transporter for transporting in a transport direction, applicator elements, and head guides. The linear transporter has three sections. Transport surfaces run parallel to one another in the first section, are oriented at an angle to one another in the second section, and again run parallel to one another in the third section. The second section includes the applicator elements, which comprise the head guides. The head guides are transversely displaceable and rotatable for single-container transport along the three sections. The apparatus is configured to bring containers together in the third section to form the pack and to transport the pack towards a discharge side. The grouping device is either a compartment unit or a compressor unit.

According to some embodiments, in the second section of the linear transporter, the applicator elements are spaced-apart from one another when seen in the transport direction. A first applicator element is arranged on an inside of a transport surface, and a second applicator element is arranged on an outside of the transport surface.

Certain embodiments further include cross-rails on which the head guides are mounted. Among these are embodiments that further include a drive element to which the cross-rails are attached to the drive element. The head guides in this embodiment are circulating head guides.

Some embodiments also include a guide rail. Each head guide includes a holding end, a guiding end, and a control extension. The guiding end of the first head guide lies opposite the holding end of the first head guide. The control extension is arranged at the guiding end, where it engages the guide rail.

Yet other embodiments include drive elements and cross-rails. The cross-rails are mounted on the drive elements. A head guide includes a moving element that has recesses through which cross-rails engage such that the head guides are displaceable along the cross-rails.

In some embodiments, a head guide includes a connecting element, and a moving element. The connecting element includes a sleeve and a shaft. The shaft is disposed in the sleeve of the connecting element. The connecting element engages through the moving element such that the connecting element moves vertically but does not rotate.

Other embodiments have a guide rail for a head guide. The guide rail is adapted for a course of the linear transporter. Among these are embodiments are those in which, in the third section, the head guides, are movable square to the transport direction along the guide rail.

In yet other embodiments, there is also a height controller, a lowering transition, and a lifting transition. The lowering transition is disposed at an entrance to the first section and the lifting transition is disposed at an exit from the third section. The lowering transition is wedge-shaped and becomes narrower along the transport direction, and the lifting transition is wedge-shaped and becomes wider along the transport direction. A free end of the height controller is guided through the lifting transition and the lowering transition. The height controller is non-rotationally mounted on the head guide such that, at the entrance to the first section, the head guide, which engages a tulip, is lowered to cause the tulip to engage a container, and at the exit from the third section, the head guide is raised to disengage the tulip from the container.

Other embodiments include an electromagnetic direct drive for moving the head guides.

In addition, there are embodiments that further include a drive element that includes cam-controlled moving elements, with the head guides being individually movable by the drive element.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below through the use of an embodiment example with reference to the figures. In the figures.

In the different figures, the same reference character in each case identifies identical parts, which is why they are generally described only once.

DETAILED DESCRIPTION

Figure 1:
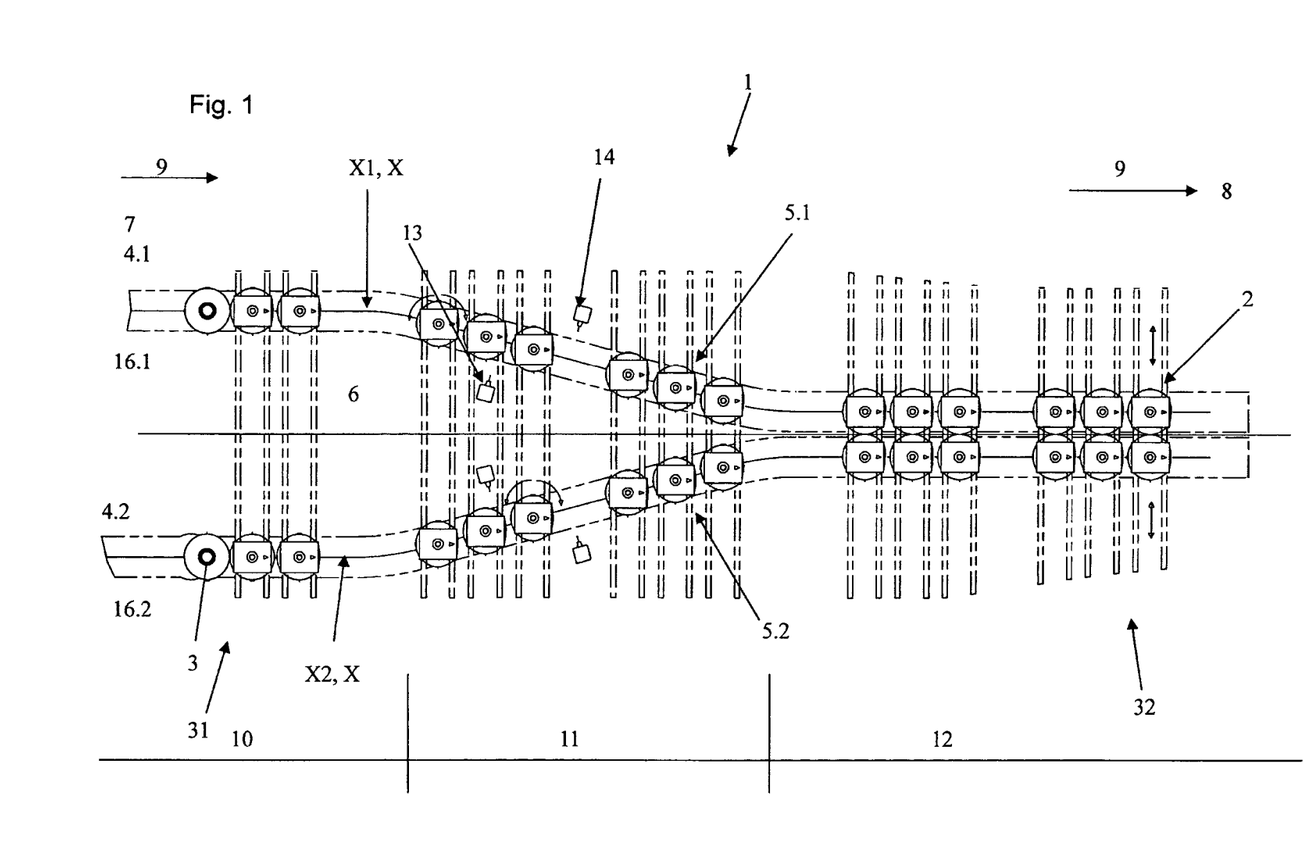
FIG. 1 shows a partial section of a device for producing a pack having six articles or containers in plan view.

FIG. 1 shows a partial section of a packing machine 1 for producing packaging units 2 from containers 3. As shown in the figure, a wide container stream of containers 3 is converted into a plurality of, as shown by way of example into two, single-track container flows 4.1, 4.2 in which the containers 3 have an arbitrary orientation relative, for example, to their container features and/or furnishing features. Through the separating and bringing together of a predetermined number of containers 3, i.e. for example three containers 3, compressed or formed part-packaging units 5.1 and 5.2 are formed and subsequently combined to form a pack 2, with at least one of the containers 3 of the pack 2, preferably each container 3, having a bonding or adhesive agent and/or a bonding or adhesive agent application on at least one contact surface or interface thereof. The contact and touching surfaces are clearly shown in the figures by the contact of containers 3 against one another but are not provided with a reference number. The containers 3 of respective part-packaging units 5.1 and 5.2 are, as can be seen in FIG. 1, still spaced apart from one another.

FIG. 1 shows a linear transporter 6 that transports containers 3 from an inlet side 7 towards an outlet side 8. The transport direction from an inlet side 7 to a discharge side 8 is indicated by arrow 9. The packing machine 1 has three sections 10, 11, 12. The first section 10 begins at the entry end and merges into the second section 11, which adjoins the third section 12.

Applicator elements 13, 14 for applying bonding or adhesive agent are provided in the second section 11 of the linear transporter 6, with transversely displaceable and rotatable head guides 15, best seen in FIGS. 2 to 6, being provided in the first section 10 of the linear transporter 6. Part-packaging units 5.1 and 5.2 are combined in the third section 12 to form complete pack 2 and conveyed towards the discharge side 8.

It is beneficial if the linear transporter 6 has, in its first section, a plurality of transport surfaces 16.1, 16.2 that convey containers 3 each in single tracks 4.1, 4.2 from the inlet side 7 towards the discharge side 8 or towards the second section 11 of the linear transporter 6. By way of example, two transport surfaces 16.1, 16.2 are provided.

In the first section 10, the exemplary two transport surfaces 16.1, 16.2 are parallel to one another. In the second section 11, the single-track container flows 4.1, 4.2, i.e. the transport surfaces 16.1, 16.2, are brought together. In the third section 12, the container flows 4.1, 4.2, i.e., the transport surfaces 16.1, 16.2, are parallel to one another once again.

At their holding end 17, the head guides 15 are, for example, configured in the manner of a tulip. A head guide 15 has a control extension 19 opposite its holding end 17, i.e.

at its guiding end 18. Head guides 15 also have a moving element 20 that is mounted displaceably on cross-rails 21.

Figure 2:
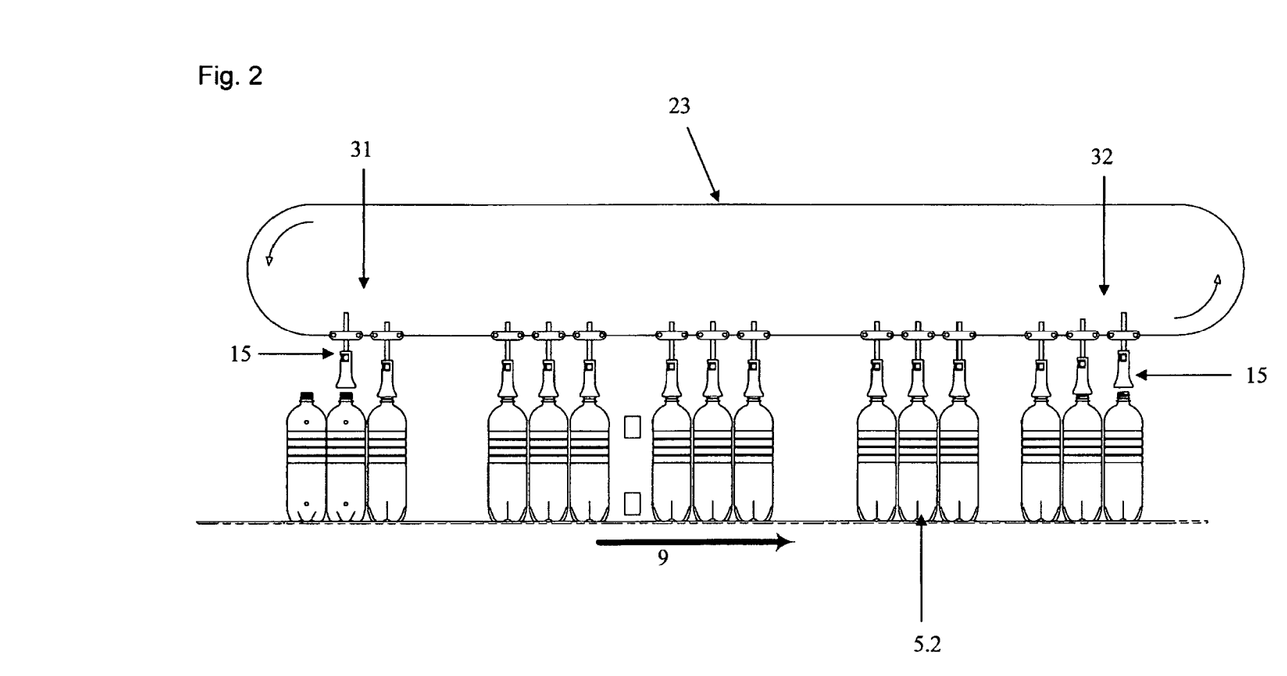
FIG. 2 shows the partial section of FIG. 1 in side view.
Figure 3:
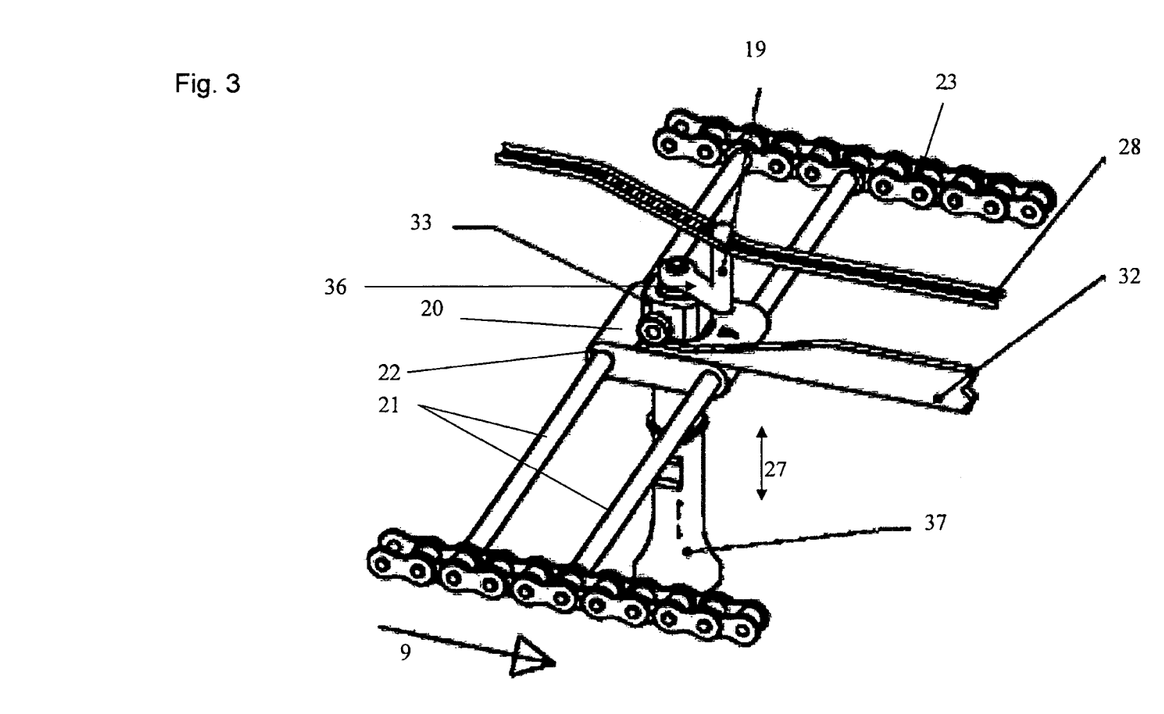
FIG. 3 is a perspective view of a head guide.
Figure 4:
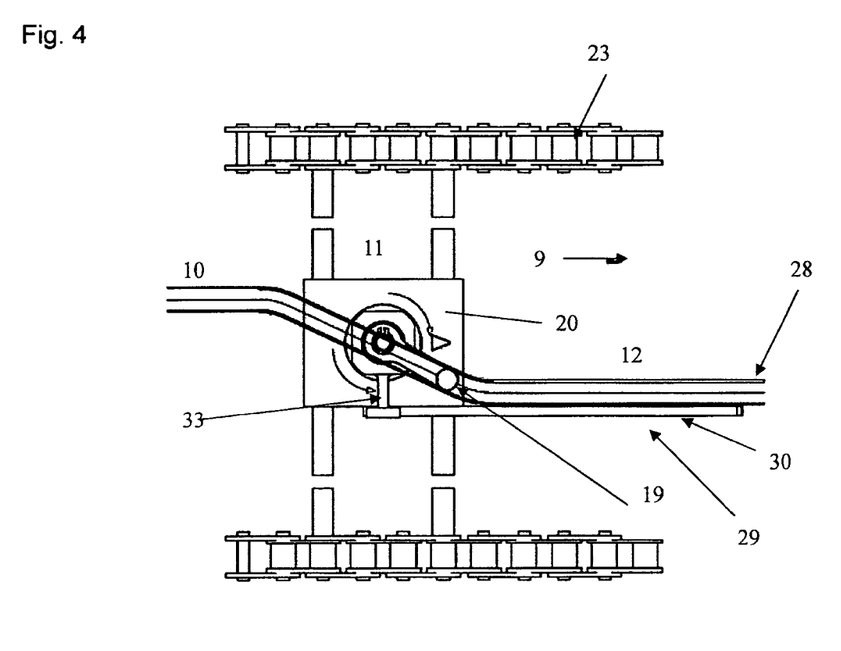
FIG. 4 shows the head guide of FIG. 3 in plan view.
Figure 5:
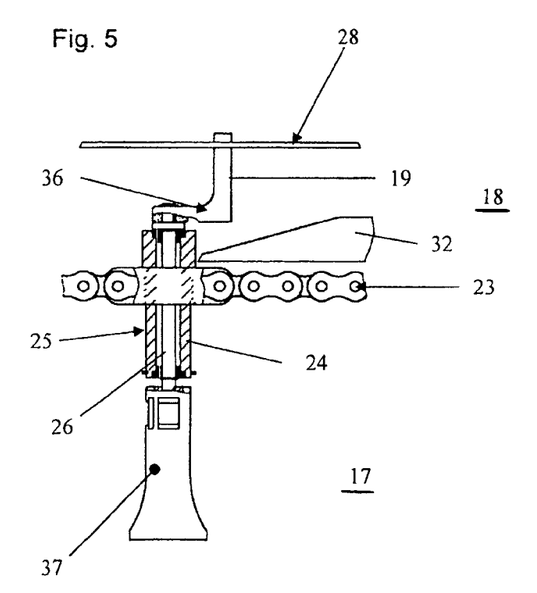
FIG. 5 shows a section through the head guide of FIG. 3.
Figure 6:
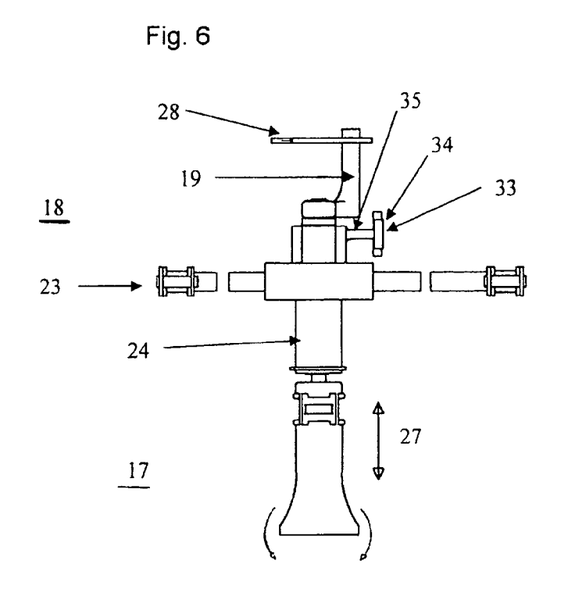
FIG. 6 shows the head guide of FIG. 3 when seen in the transport direction.

Moving element 20 may also be referred to as a plate that, at each of its ends when seen in transport direction 9 has recesses or bores 22 through which cross-rails 21 engage. Cross-rails 21 are spaced apart from one another when seen in the transport direction 9 and are mounted at either end on a drive element 23. The drive element 23 can be a motor-driven chain and is preferably continuously circulating, as shown in FIG. 2. The head guides 15 are therefore also continuously circulating, as FIG. 2 schematically indicates.

The entire drive element 23 is preferably height-adjustable, in particular vertically displaceable by a motor so as to adjust the vertical clearance between the linear transporter 6 and the drive element 23 in the event of a format change to a different container size.

A connecting element 24 connects the guiding end 18 with the holding end 17 and engages through the moving element 20. In a preferred embodiment, the connecting element 24 has a non-rotatably mounted sleeve 25 in which a shaft 26 is arranged. Despite its being mounted so that it cannot rotate, the sleeve 25 is mounted such that it can move vertically, as shown by the double arrow 27, and as described in more detail hereinafter. The sleeve 25 has a greater diameter at its guiding end than at its holding end.

In one embodiment, two head guides 15 are disposed on common cross-rails 21. By way of example, only one head guide 15 is disposed on a cross-rail 21. In this exemplary embodiment, one head guide track is associated with each container stream 4.1, 4.2, i.e. each of transport surfaces 16.1, 16.2. Above the transport surface 16.1, 16.2, a guide rail 28 through which the control extension 19 engages, is associated with each head guide track 15. The center-line X of a respective guide rail 28 is preferably congruent with the center-line X1, X2 of a respectively associated transport surface 16.1, 16.2, although an offset arrangement of guide rails 28 relative to respective transport surfaces 16.1, 16.2 is also possible, provided that the control extension 19 is configured accordingly, as indicated in FIGS. 3-6 in which an offset compensation element 36 is provided.

The offset compensation element 36 may always be provided, even if the center-lines run congruently. This means, in essence, that in its three sections 10, 11, 12, the guide rail 28 is implemented identically according to the course of linear transporter 6. In other words it is preferable to provide for the two guide rails 28 to be spaced apart from one another in the first section 10 when seen square to transport direction 9.

In the second section 11, the two guide rails 28 run at an angle toward one another. Then, in the third section 12, they continue on, running parallel, and adjacent to one another.

As the control extension 19 now traverses the second section 11, it transversely displaces respective, initially spaced-apart head guides 15 toward one another as the tulip simultaneously rotates. As a result, the control extension 19 is now in rotational engagement with the shaft 26. Measures that prevent a rotation of the shaft 26 can be provided in first and third sections 10, 12. A defined rotation of containers 3 held on a respective head guide 15 can be brought about in this way.

In the second section 11, the applicator elements 13, 14 are each disposed on one of transport surfaces 16.1, 16.2. The applicator elements 13, 14 apply the bonding or adhesive agent to the contact surfaces and interfaces of containers 3. When seen in transport direction 9, the applicator elements 13 and 14 are provided one following the other. This allows for the rotation of a container 3 held at a tulip, with the applicator elements 13 and 14 being, for example, disposed on the inside and outside respectively.

Through the rotation of containers 3 about their vertical axis as they are simultaneously conveyed along the angled transport direction 9, contact surfaces and interfaces that are offset when seen in the peripheral direction of the containers 3 can be provided with a bonding or adhesive agent. This promotes adhesive bond of the pack as a whole because every container 3 can form an adhesive bond with its immediately neighboring container 3 in the pack on at least two contact surfaces and interfaces.

In FIG. 1, a space is visible between the containers 3 when seen in transport direction 9 such that the pack can be formed from two containers 3. It is however also preferable for the head guides 15 and the containers 3 held thereon to be brought closer to one another in the third section 12, with the pack 2 being formed preferably from six containers 3. In this case the gap visible in FIGS. 1 and 2 between successive containers 3 of a pack 2 would be closed, with the contact surfaces and interfaces being connected to one another. The head guides 15 can now exert a force not only in or contrary to the transport direction 9 but also square to the transport direction 9 such that the containers 3 of a pack 2 are pressed up against one another under the action of the force. This has a positive influence on the adhesive bond.

In addition, the guide rails 28 could also be brought closer together so as to displace the containers 3 further square to transport direction 9 to increase the pressing force acting square to transport direction 9.

As previously stated, the sleeve 25 is mounted so that it can move vertically but not rotate. The rotation of the control extension 19 is transmitted to the tulip by the inner shaft 26.

In one embodiment, a height control 29 is provided to lower the tulip onto the containers 3 at the entrance to the first section 10 and to lift the tulip off at the exit from third section 12. In a preferred embodiment, the height control 29 comprises a rail 30 that is arranged parallel to the guide rail 28. At the entry to first section 10, the rail 30 has a lowering transition 31 that becomes narrower in the manner of a wedge. At the exit from the third section 12, the rail 30 has an opposing lifting transition that becomes wider in the manner of wedge. A height control element 33 that, at its free end 34, has, for example, a roller for rolling along a rail 30 and that is permanently, non-rotatably connected to sleeve 25 by a link 35 opposite the free end 34, is interactively coupled with the rail 30. By rolling or guiding along the rail 30 a change in height along transport direction 9 can thus be correspondingly transmitted to the head guides 15 or to the sleeves 25, and hence to lower or lift the tulips.

It is shown by way of example that the wedge-shaped lowering transition 31 is provided at the entrance to the first section 10 and that the wedge-shaped lifting transition 32 is not provided until the exit from the third section 12, with a height control, that is to say the continuation of the rail between both transitions 31 and 32, being dispensed with between the two transitions 31 and 32. To limit vertical movement, if the rail 30 between the transitions 31 and 32 is dispensed with, then use can be made of the advantageous embodiment of a sleeve 25 with its greater diameter at its guiding end and that, at its guiding end, lowers down onto moving element 20, i.e. onto the plate, like a lock to limit the downward vertical movement, which is the movement in the direction of gravity.

The number of head guides 15 matches the number of single-track container flows 4.1 and 4.2 such that, for example, two adjacent head guides 15 can be provided on common cross-rails 21.

The head guides 15 engage over the container head from above to stabilize the position of a container being transported in the transport direction 9. The head guides 15 also stabilize the positions of containers as the container flows are brought back together to form the pack 2, including along the transport surfaces 16.1, 16.2 or the guide rails 28 that run at an angle to the direction of the center-line in the second section 11.

Figure 7:
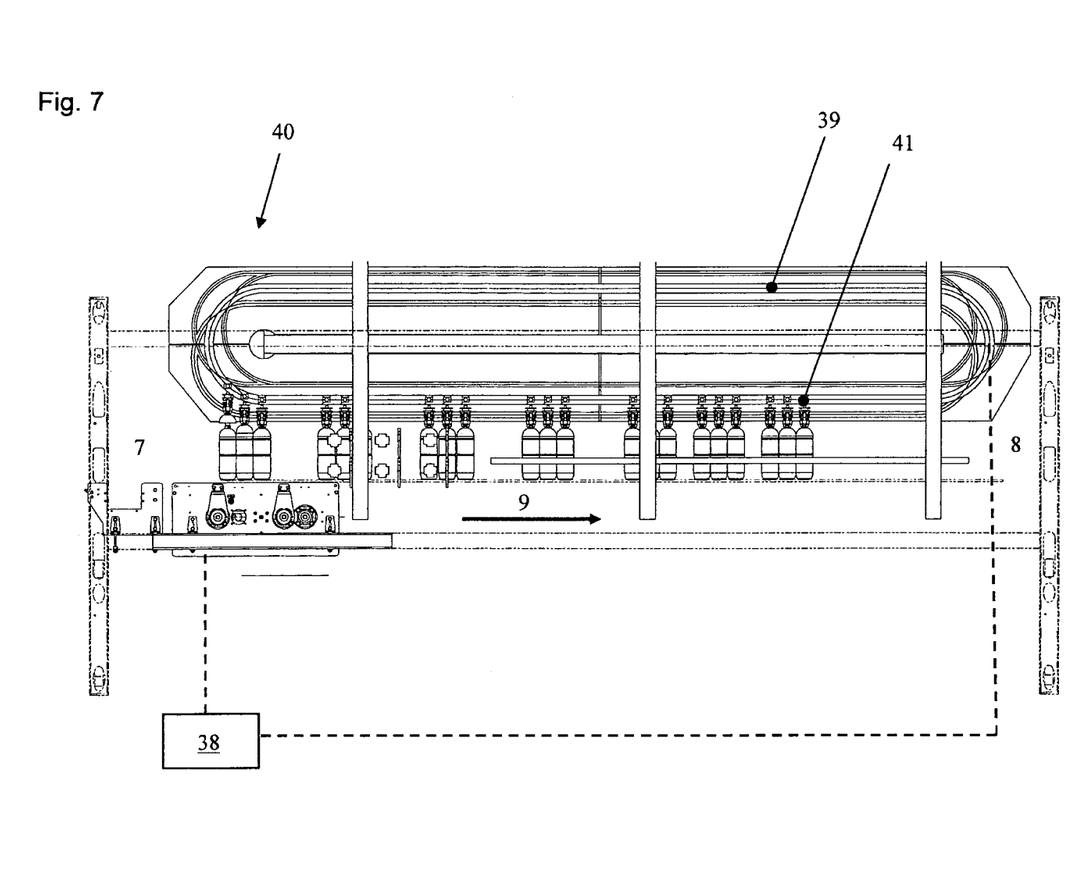
FIG. 7 shows a schematic side view of the device of FIG. 1 in which the head guides of the containers can be displaced by way of electromagnetic direct drives.
Figure 8:
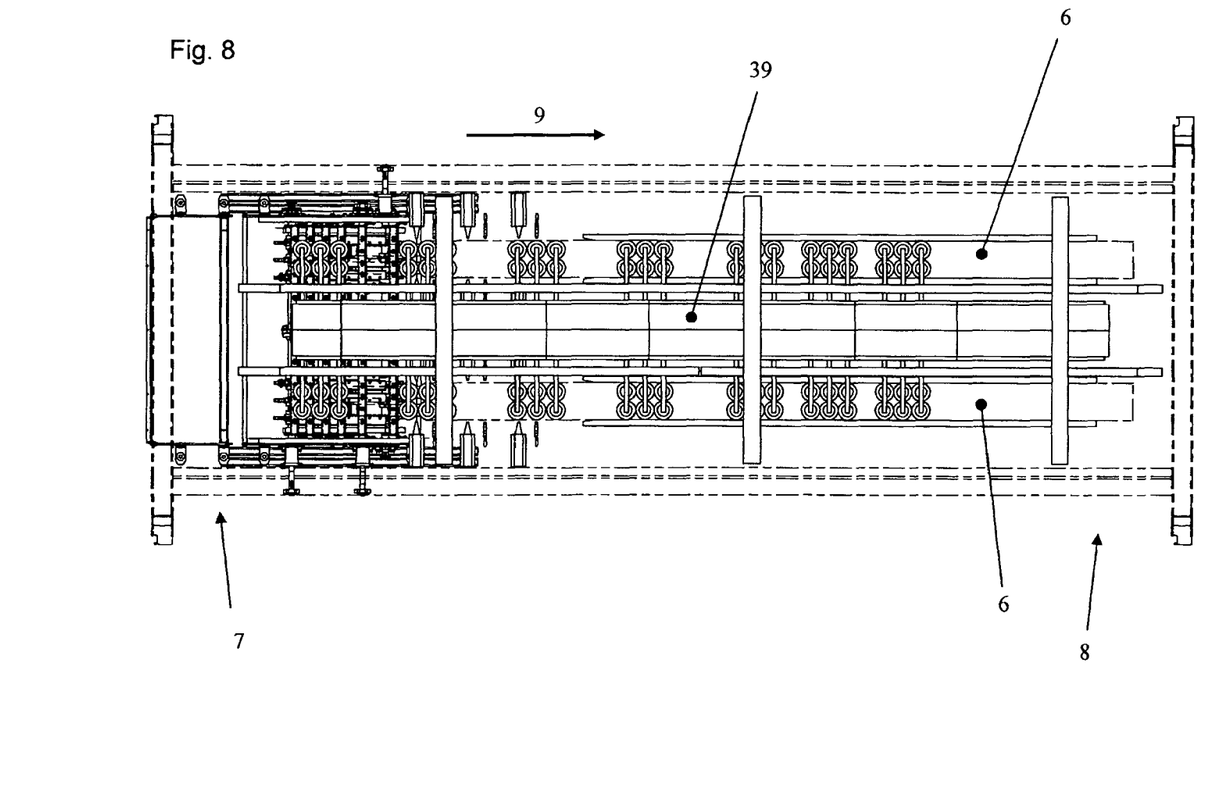
FIG. 8 shows a schematic plan view of the device of FIG. 7, with an electromagnetic direct drive arranged centrally between the containers for the container guiding.
Figure 9:
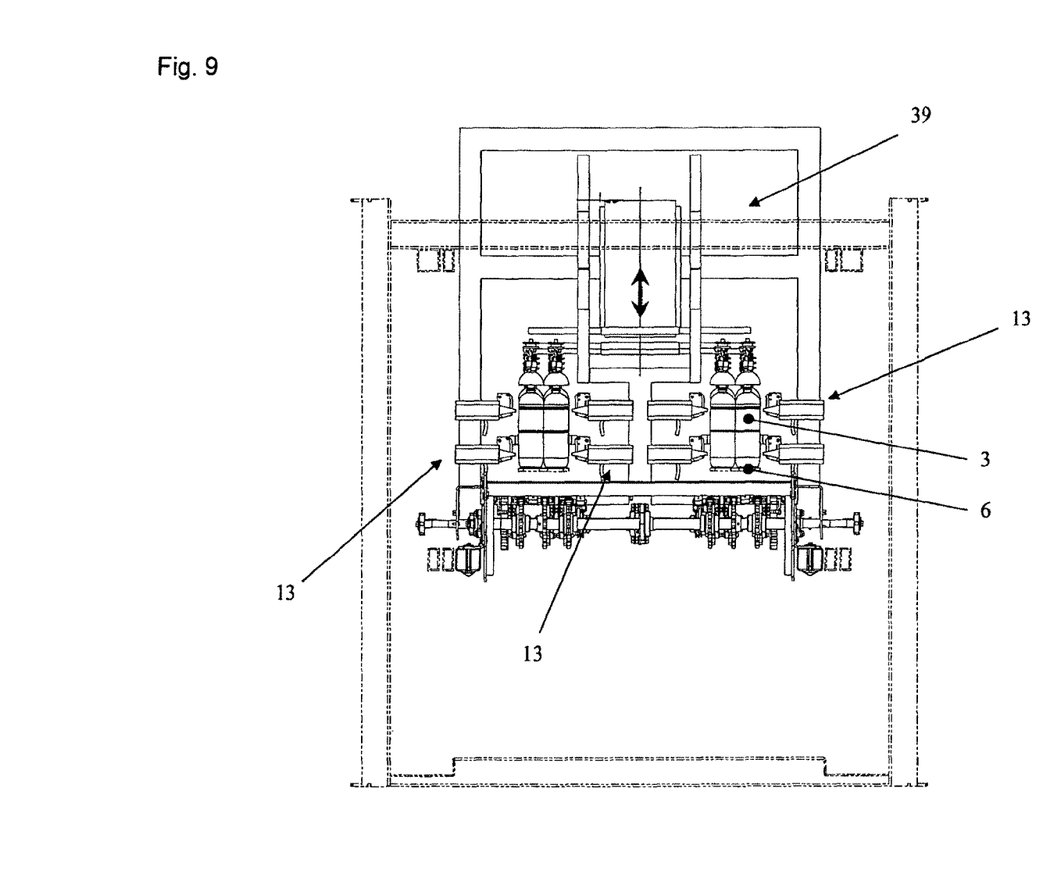
FIG. 9 shows a schematic front view of the device of FIG. 7, with a height-adjustable electromagnetic direct drive arranged centrally between the containers for the container guiding.

FIGS. 7 to 9 show a variant of a head guide that is configured as an electromagnetic direct drive 39. In FIG. 7, at the inlet side 7 of the packaging machine 1, analogously filled and capped containers 3 are transferred from an outer transporter, which is not shown, to a head guide 15 that moves past the container inlet, with a centering bell 37 being initially in the raised position or descending. The centering bell 37, which is controlled by a control unit 38 and driven by the height control 29, is subsequently lowered such that it picks up a container 3 in the region of its container mouth and in the region of the container cap which is located near the container mouth. As a result, the container 3 is held between the centering bell 37 and the linear transporter 6.

The linear transporter 6 and the drive element 23, or their electromagnetic direct drive 39, are controlled such that whenever a container 3 is present in the inlet region of the packaging machine 1, a centering bell 37 picks up the container 3, and the linear transporter 6 and the head guide 15 convey the container 3 synchronously through the three sections 10, 11, 12. After the height control 29 has lifted the centering bell 37 off the container in the third section 12, the head guide 15 accelerates and moves the centering bell 37 to the waiting position back at the inlet side 7 of the device 1. A plurality of individually moveable head guides 15 in the form of carriages 41 are attached to the drive element 23. These, in turn, drive cam-controlled moving elements 20 and so ensure the motion, rotation, and pressure on the containers 3 as they move from the inlet side 7 to the discharge side 8 through the three sections 10, 11, 12.

At this juncture, the electromagnetic drive of the circulating head guides 15 or groups of laterally adjacent head guides 15 is carried out individually, i.e. independently of trailing or leading head guides 15. This offers the advantage that, after it releases a container 3, the head guide 15 can be accelerated very quickly on its way back. The head guides 15 remain above the inlet region 7 in waiting position in a slow-approach or start/stop system. Overall, therefore far fewer head guides 15 or groups of head guides 15 are needed, as compared with an evenly populated drive.

A particularly beneficial but not depicted embodiment dispenses with separate height control 29. This is possible if an acceleration of the head guides 15 in the transport direction is induced by the control in the curve region or in the lowering phase that is synchronously with the constant, or acceleration-free, transport speed of the container 3 on the linear transporter. The descent of a centering bell 37 is thus effected according to the curved contour of the head drive.

When a centering bell 37 is raised, the head guide 15 is analogously decelerated in the discharge region 8 by appropriate control such that it is advanced synchronously at all times with the container 3 in the transport direction of containers 3 so long as the latter are in contact or can come into contact, as they have not yet been completely removed from one another.

The detailed solutions shown in FIGS. 1 to 6 and described above for rotating the containers, for applying adhesive to containers, for combining the individual containers into the respective container groups or packaging units, for the height adjustment/adaptation of the complete head drive, can of course also be analogously applied to the variants of the embodiment last described and shown in FIGS. 7 to 9.

Having described the invention, and a preferred embodiment thereof, what is claimed as new, and secured by Letters Patent is:

The invention claimed is:

1. An apparatus for producing a container pack with containers received from a plurality of single-track container flows that have been converted by lane division from a wide container stream, wherein a grouping device that compartmentalizes and compresses a predetermined number of containers has formed said containers into part-container packs that are to be subsequently combined to form said container pack, wherein applicator elements provide at least one of said containers of said container pack with an adhesive on a location on said at least one of said containers, said location being selected from the, group consisting of a contact surface on said at least one of said containers and an interface on said at least one of said containers, said adhesive being selected from the group consisting of a bonding agent and an adhesive agent, said apparatus comprising a linear transporter for transporting in a transport direction, applicator elements, and head guides, wherein said linear transporter comprises a first section, a second section, and a third section, wherein transport surfaces run parallel to one another in said first section, wherein said transport surfaces are oriented at an angle to one another in said second section, and wherein said transport surfaces again run parallel to one another in said third section, wherein said second section comprises said applicator elements, wherein said head guides are transversely displaceable and rotatable far single-container transport along said first, second, and third sections, wherein said apparatus is configured to bring containers together in said third section to form said pack and to transport said pack towards a discharge side, wherein the grouping device is selected from the group consisting of a compartment unit and a compressor unit.

2. The apparatus of claim 1, wherein, in said second section of said linear transporter, said applicator elements are arranged spaced apart from one another when seen in said transport direction, wherein said applicator elements comprise a first applicator element and a second applicator element, wherein said first applicator element is arranged on an inside of a transport surface, and wherein said second applicator element is arranged on an outside of said transport surface.

3. The apparatus of claim 1, further comprising cross-rails, wherein said head guides are mounted on said cross-rails.

4. The apparatus of claim 3, further comprising a drive element, wherein said cross-rails are attached to said drive element, and wherein said head guides are circulating.

5. The apparatus of claim 1, further comprising a guide rail, wherein said head guides comprise a first head guide, wherein said first head guide comprises a holding end, a guiding end, and a control extension, wherein said guiding end of said first head guide lies opposite said holding end of said first head guide, wherein said control extension is arranged at said guiding end, and wherein said control extension engages said guide rail.

6. The apparatus of claim 1, further comprising drive elements, and cross-rails, wherein said cross-rails are mounted on said drive elements, wherein said head guides comprise a first head guide, wherein, said first head guide comprises a moving element, wherein said moving element comprises recesses through which cross-rails engage such that said head guides are displaceable along said cross-rails.

7. The apparatus of claim 1, wherein said head guides comprise a first head guide, wherein said first head guide comprises a connecting element, and a moving element, wherein said connecting element comprises a sleeve and a shaft, wherein said shaft is disposed in said sleeve of said connecting element, wherein said connecting element engages through said moving element such that said connecting element moves vertically but does not rotate.

8. The apparatus of claim 1, wherein said head guides comprise a first head guide, said apparatus further comprising a guide rail for said first head guide, wherein said guide rail is adapted for a course of said linear transporter.

9. The apparatus of claim 8, wherein, in said third section, said head guides, are movable square to said transport direction along said guide rail.

10. The apparatus of claim 1, further comprising a height controller, a lowering transition, and a lifting transition, wherein said lowering transition is disposed at an entrance to said first section, wherein said lifting transition is disposed at an exit from said third section, wherein said lowering transition is wedge-shaped and becomes narrower along the transport direction, wherein said lifting transition is wedge-shaped and becomes wider along the transport direction, wherein a free end of said height controller is guided through said lifting transition and said lowering transition, wherein said height controller is non-rotationally mounted on said head guide such that, at said entrance to said first section, said head guide, which engages a tulip, is lowered to cause said tulip to engage a container, and at said exit from said third section, said head guide is raised to disengage said tulip from said container.

11. The apparatus of claim 1, further comprising an electromagnetic direct drive for moving said head guides.

12. The apparatus of claim 1, further comprising a drive element, wherein said drive element comprises cam-controlled moving elements, wherein said head guides are individually movable by said drive element.

* * * * *